United States Patent
Osada

(10) Patent No.: US 11,086,300 B2
(45) Date of Patent: Aug. 10, 2021

(54) CONTROL METHOD, CONTROL DEVICE AND PROGRAM RECORDING MEDIUM

(71) Applicant: FANUC CORPORATION, Yamanashi (JP)

(72) Inventor: Reo Osada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/687,566

(22) Filed: Nov. 18, 2019

(65) Prior Publication Data

US 2020/0209833 A1    Jul. 2, 2020

(30) Foreign Application Priority Data

Dec. 26, 2018  (JP) .............................. JP2018-242846

(51) Int. Cl.
  *G05B 19/416*    (2006.01)
  *G05B 19/402*    (2006.01)
  *G05B 19/4063*   (2006.01)

(52) U.S. Cl.
  CPC ......... *G05B 19/416* (2013.01); *G05B 19/402* (2013.01); *G05B 19/4063* (2013.01)

(58) Field of Classification Search
  None
  See application file for complete search history.

(56) References Cited

U.S. PATENT DOCUMENTS 7,792,604 B2 *  9/2010  Hong ................. G05B 19/4103
                                        700/188

FOREIGN PATENT DOCUMENTS

| JP | H07-191757 A    | 7/1995 |
| JP | 2007-052590 A   | 3/2007 |
| JP | 2016-024661 A   | 2/2016 |
| WO | 2018/163665 A1  | 9/2018 |

OTHER PUBLICATIONS

An Office Action; "Notice of Reasons for Refusal", mailed by the Japanese Patent Office dated Apr. 6, 2021, which corresponds to Japanese Patent Application No. 2018-242846 and is related to U.S. Appl. No. 16/687,566; with English language translation.

* cited by examiner

*Primary Examiner* — Carlos R Ortiz Rodriguez
(74) *Attorney, Agent, or Firm* — Studebaker & Brackett PC

(57) ABSTRACT

A control method according to the present invention is a control method for a drive mechanism in a drive system which causes a mobile body to move by way of the drive mechanism in accordance with an instruction from a master controller, the method including: an abnormality detection step of detecting an abnormal state in which control by the master controller is not possible; a remaining distance calculation step of calculating a remaining distance until a movement limit position in a current movement direction of the mobile body, when having detected an abnormal state in the abnormality detection step; a limit deceleration calculation step of calculating a limit deceleration in which the mobile body can stop in the remaining distance which was calculated in the remaining distance calculation step; and a limit stop control step of controlling the drive mechanism so as to cause the mobile body to stop at a deceleration of at least the limit deceleration.

4 Claims, 2 Drawing Sheets

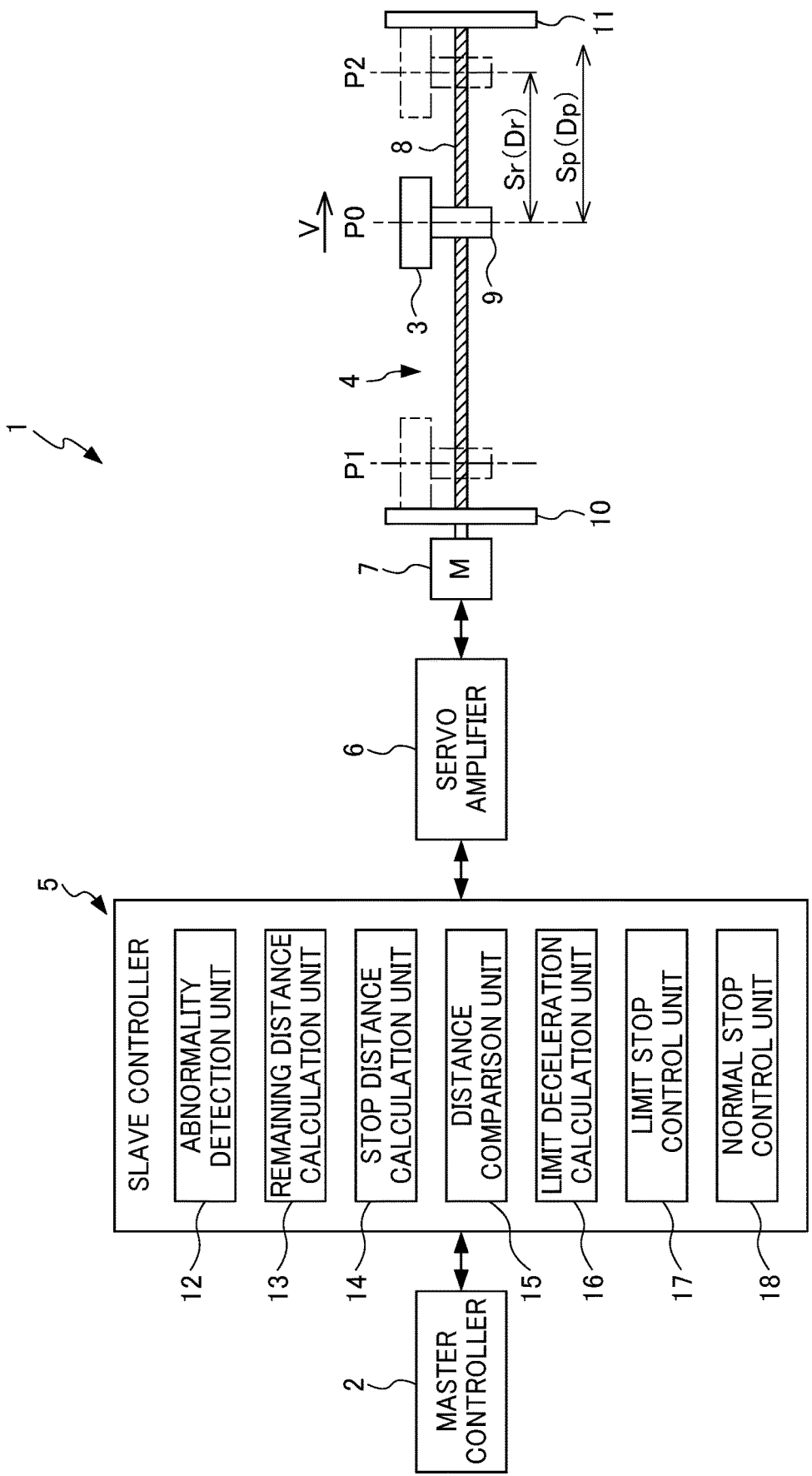

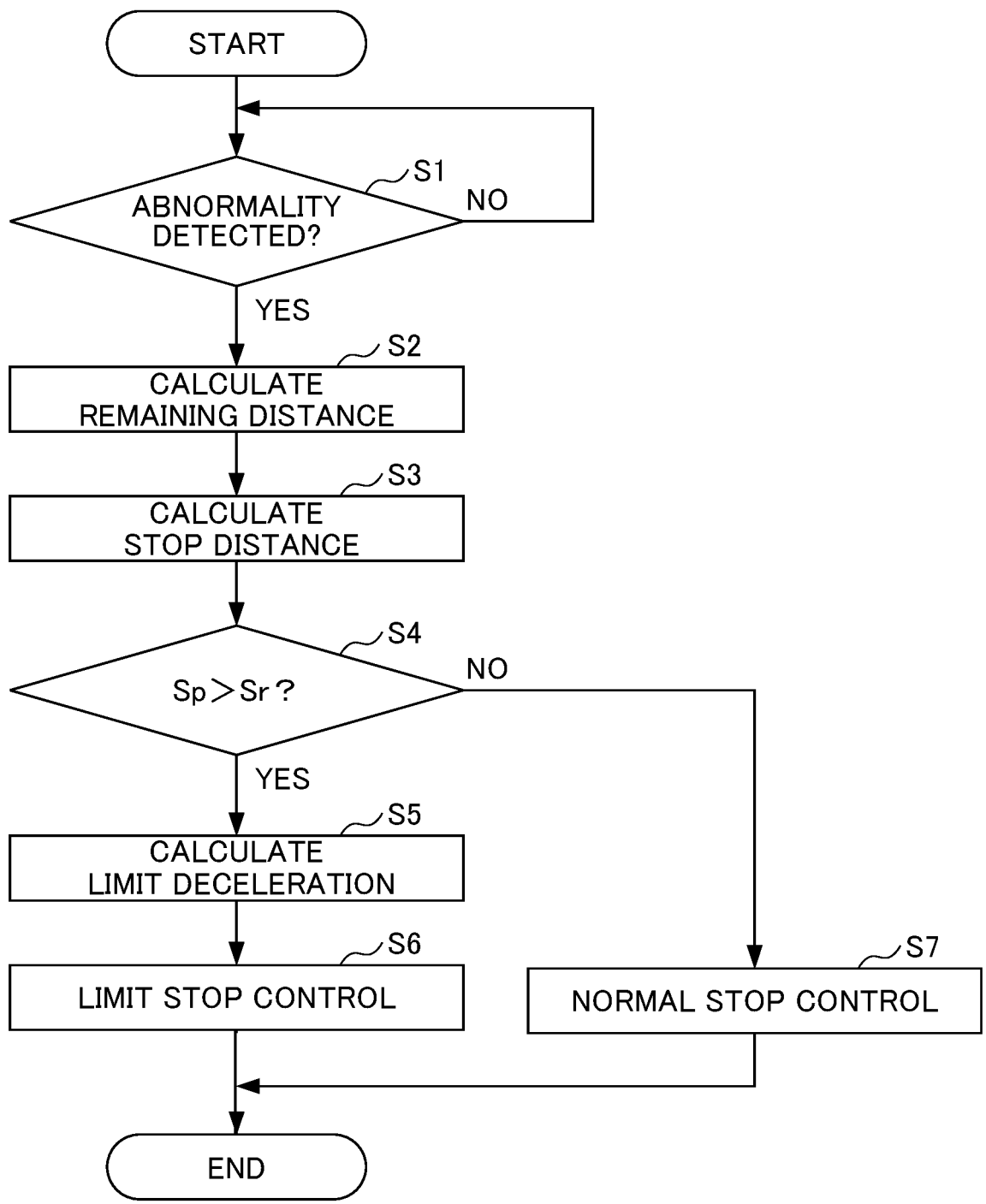

CONTROL METHOD, CONTROL DEVICE AND PROGRAM RECORDING MEDIUM

BACKGROUND OF THE INVENTION

This application is based on and claims the benefit of priority from Japanese Patent Application No. 2018-242846, filed on 26 Dec. 2018, the content of which is incorporated herein by reference.

Field of the Invention

The present invention relates to a control method, a control device and a program recording medium.

Related Art

Among machine tools, etc. having a plurality of drives axes, there are those which include a drive system that is controlled so that the plurality of drive axes cooperate, by respectively controlling the drive mechanism of each drive axis by way of independent control devices (slave controllers), and instructing the action required in each of the drive axes to the respective control devices from a master controller.

In the case of the drive mechanism being one which causes a mobile body to move linearly, since the movable range of the mobile body is limited, the master controller is programmed so as to cause the mobile body to only move within the movable range. However, for example, in a case of entering an abnormal state in which control of the slave controllers is not possible by the master controller while the mobile body is moving, due to a communication abnormality between the master controller and slave controller, or the like, the slave controller must stop the mobile body by its own determination, so that the mobile body does not collide with other constituent elements by moving to exceed the movement limit position.

As the stopping method of the mobile body during such abnormality, it is possible to exemplify electrical current limit stop which causes a mobile body to stop by decelerating at the maximum torque of a motor; a free-run stop which causes a mobile body to stop naturally by way of the motor, loss of the circuit driving the motor, friction of the drive mechanism or the like without controlling the motor; and decelerated stop which controls so as to cause the mobile body to stop at a fixed deceleration (negative acceleration) which is set in advance. The electrical current limit stop can stop the mobile body at the shortest distance; however, it tends to generate vibration and the load on the drive mechanism is great. On the other hand, the free-run stop and decelerated stop may not be able to prevent the mobile body from colliding with other constituent elements, depending on the timing at which detecting the abnormal state.

Patent Document 1 listed below discloses technology which prevents a mobile body (stage) from moving to exceed a movement limit position and colliding with a support frame, by adopting the decelerated stop. More specifically, Patent Document 1 discloses a positioning stage device which calculates a permitted value of movement speed at the detected position of a stage as a value decelerating at a fixed deceleration, generates an abnormality signal when the calculated permitted value is no more than the detected movement speed, and operates a brake and causes movement of the stage to stop. With this method, there is concern over not being able to prevent the stage from colliding with the support frame if not making the setting of deceleration as large as possible, and it is necessary to limit the normal range of movement of the stage to be small. Making the setting of deceleration large is not preferable due to increasing the possibility for vibration generation, and limiting the normal range of movement of the stage is not preferable.

Patent Document 1: Japanese Unexamined Patent Application, Publication. No. H07-191757

SUMMARY OF THE INVENTION

The present invention has an object of providing a control method, control device and program recording medium which safely stop a mobile body, when an abnormal state arises in which control is not possible by a master controller.

A control method according to a first aspect of the present invention is for a drive mechanism (for example, the drive mechanism 4 described later) in a drive system (for example, the drive system 1 described later) which causes a mobile body (for example, the mobile body 3 described later) to move by way of the drive mechanism according to an instruction from a master controller (for example, the master controller 2 described later), the control method including: an abnormality detection step (for example, the abnormality detection step of Step S1 described later) of detecting an abnormal state in which control by the master controller is not possible; a remaining distance calculation step (for example, the remaining distance calculation step of Step S2 described later) of calculating a remaining distance until a movement limit position in a current movement direction of the mobile body, when having detected an abnormal state in the abnormality detection step; a limit deceleration calculation step (for example, the limit deceleration calculation step of Step S5 described later) of calculating a limit deceleration in which the mobile body can stop in the remaining distance which was calculated in the remaining distance calculation step; and a limit stop control step (for example, the limit step control step of Step S6 described later) of controlling the drive mechanism so as to cause the mobile body to stop at a deceleration of at least the limit deceleration.

According to a second aspect of the present invention, the control method as described in the first aspect may further include: a stop distance calculation step (for example, the stop distance calculation step of Step S3 described later) of calculating a stop distance by which the mobile body moves until stopping in a case of decelerating at a setting deceleration which is set in advance, when having detected an abnormal state in the abnormality detection step; and a normal stop control step (for example, the normal stop control step of Step S7 described later) of controlling the drive mechanism so as to cause the mobile body to stop at the setting deceleration, in a case of the stop distance being no more than the remaining distance, in which the limit stop control step is performed only in a case of the stop distance exceeding the remaining distance.

A control device (for example, the slave controller 5 described later) according to a third aspect of the present invention controls a drive mechanism (for example, the drive mechanism 4 described later) which causes a mobile body (for example, the mobile body 3 described later) to move according to an instruction from a master controller (for example, the master controller 2 described later), the control device including: an abnormality detection unit (for example, the abnormality detection unit 12 described later) which detects an abnormal state in which control by the master controller is not possible; a remaining distance calculation unit (for example, the remaining distance calculation unit 13 described later) which calculates a remaining distance until a movement limit position in a current movement direction of the mobile body, when the abnormality detection unit detected an abnormal state; a limit deceleration calculation unit (for example, the limit deceleration calculation unit 16 described later) which calculates a limit deceleration in which the mobile body can stop in the remaining distance calculated by the remaining distance calculation unit; and a limit stop control unit (for example, the limit stop control unit 17 described later) which controls the drive mechanism so as to cause the mobile body to stop at a deceleration of at least the limit deceleration.

A program recording medium according to a fourth aspect of the present invention is a program recording medium which non-transitorily records program for a control device controlling a drive mechanism (for example, the drive mechanism 4 described later) that causes a mobile body (for example, the mobile body 3 described later) to move according to an instruction from a master controller (for example, the master controller 2 described later), the program including: an abnormality detection element which detects an abnormal state in which control by the master controller is not possible; a remaining distance calculation element which calculates a remaining distance until a movement limit position in a current movement direction of the mobile body, when the abnormality detection element detected an abnormal state; a limit deceleration calculation element which calculates a limit deceleration in which the mobile body can stop in the remaining distance calculated by the remaining distance calculation element; and a limit stop control element which controls the drive mechanism so as to cause the mobile body to stop at a deceleration of at least the limit deceleration.

According to the present invention, it is possible to provide a control method, control device and program which can safely make a mobile body stop when an abnormal state arises in which control by a master controller is not possible.

BRIEF DESCRIPTION OF THE DRAWINGS

FIG. 1 is a schematic diagram showing the configuration of a drive system including a control device according to an embodiment of the present invention; and FIG. 2 is a flowchart showing a sequence of control of the control device in FIG. 1.

DETAILED DESCRIPTION OF THE INVENTION

Hereinafter, an embodiment of the present invention will be explained while referencing the drawings. FIG. 1 is a schematic diagram showing the configuration of a drive system 1 including a control device according to an embodiment of the present invention. FIG. 2 is a flowchart showing the sequence of control of the control device in FIG. 1.

The drive system 1 includes a master controller 2, a drive mechanism 4 which drives a mobile body 3, and a slave controller 5 according to the embodiment of the present invention which controls the drive mechanism 4.

The drive system 1 is a system which linearly moves the mobile body 3 such as a table, for example, of a machine tool, for example, and causes the mobile body 3 to move following an instruction of the master controller 2. The drive system 1 can include other constituent elements (not shown) which are driven according to an instruction of the master controller 2, and can position the mobile body 3 in cooperation with the movement of the other constituent element. As one example, the drive system 1 can be used in order to configure a machine tool that performs desired machining on a machining target (workpiece), by retaining the machining target (workpiece) to the mobile body 3, and the relative position with a tool that is positioned by the other constituent element being controlled.

The master controller 2 is a control device such as a numerical control device, for example. The master controller 2 can be realized by reading a control program into a computer device having a CPU, memory, etc., for example.

It is sufficient if the drive mechanism 4 can do positioning control of the mobile body 3 in accordance with input signals from the slave controller 5. Although not particularly limited, the configuration of the drive mechanism 4 can be established as a configuration having a servo amplifier 6 which outputs voltage according to the input signal from the slave controller 5, a servomotor 7 which is driven by the output voltage of the servo amplifier 6, a feed screw 8 which is made to rotate by the servomotor 7, and a nut 9 which is engaged with the feed screw 8 and is fixed to the mobile body 3, as shown in the drawings. In the drive mechanism 4 illustrated, movement limit positions (both ends of a moveable range) P1, P2 of the mobile body 3 are defined by support bodies 10, 11 which support both ends of the feed screw 8.

The slave controller 5 causes the mobile body 3 to move by the drive mechanism 4 in accordance with an instruction from the master controller 2. In other words, the slave controller 5 determines the rotation speed of the servomotor 7, and inputs this information to the servo amplifier 6, so as to move and position the mobile body 3 at the position or speed instructed from the master controller 2.

The slave controller 5 is a device which implements a control method according to an embodiment of the present invention. The slave controller 5 may be configured by a dedicated circuit board or module having an integrated circuit, etc., or may be a control device realized by reading a program according to the present invention into a computer having a CPU, memory, etc.

The slave controller 5 includes an abnormality detection unit 12, a remaining distance calculation unit 13, a stop distance calculation unit 14, a distance comparison unit 15, a limit deceleration calculation unit 16, a limit stop control unit 17, and a normal stop control unit 18. These constituent elements are functionally demarcated, and are not necessarily independent physically or in a program for realizing the slave controller 5.

The control method according to the embodiment of the present invention performed by the slave controller 5, as shown in FIG. 2, includes an abnormality detection step (Step S1), remaining distance calculation step (Step S1), stop distance calculation step (Step S3), distance comparison step (Step S4), limit deceleration calculation step (Step S5), limit stop control step (Step S6), and normal stop control step (Step S7). The abnormality detection unit 12 of the slave controller 5 is a constituent element which executes the abnormality detection step of Step S1; the remaining distance calculation unit 13 is a constituent element which executes the remaining distance calculation step of Step S2; the stop distance calculation unit 14 is a constituent element which executes the stop distance calculation step of Step S3; the distance comparison unit 15 is a constituent element which executes the stop distance calculation step of Step S4; the limit deceleration calculation unit 16 is a constituent element which executes the limit deceleration calculation step of Step S5; the limit stop control unit 17 is a constituent element which executes the limit stop control step of Step S6; and the normal stop control unit 18 is a constituent element which executes the normal stop control step of Step S7.

In addition, the program according to an embodiment of the present invention realizing the slave controller 5 includes: an abnormality detection element which is a program element that executes the abnormality detection step of Step S1; a remaining distance calculation element which is a program element that executes the remaining distance calculation step of Step S2; a stop distance calculation element which is a program element that executes the step of Step S3; a stop distance calculation element which is a program element that executes the stop distance calculation step of Step S4; a limit deceleration calculation element which is a program element that executes the limit deceleration calculation step of Step S5; a limit stop calculation element which is a program element that executes the limit stop control step of Step S6; and a normal stop control element which is a program element that executes the normal stop control step of Step S7. It should be noted that the program according to the present invention can be provided by recording in non-transitory recording medium.

In the abnormality detection step of Step S1, the abnormality detection unit 12 detects an abnormal state in which control by the master controller 2 is not possible. As a specific example, the abnormality detection unit 12 can be configured so as to determine as being an abnormal state, in a case of the control signal from the master controller 2 being interrupted, case of receiving an abnormality signal from the master controller 2, etc.

When the abnormality detection unit 12 detects an abnormal state in the abnormality detection step of Step S1, the remaining distance calculation unit 13 calculates the remaining distance Sr until a movement limit position in the current movement direction of the mobile body 3, in the remaining distance calculation step of Step S2. In FIG. 1, the mobile body 3 moves to the right, and the remaining distance Sr is the distance from the current position P0 of the mobile body 3 until the movement limit position P2 on the right side. It should be noted that the movement limit positions P1, P2 used upon calculating the remaining distance S3 may be defined as the position at which the mobile body 3 abuts the support bodies 10, 11, or as a position leaving a certain margin.

When the abnormality detection unit 12 detects an abnormal state in the abnormality detection step of Step S1, the stop distance calculation unit 14 acquires the current velocity V of the mobile body 3, and calculates the stop distance Sp to move until the mobile body 3 stops in the case of decelerating at the set deceleration Dp which is set in advance, in the stop distance calculation step of Step S3. More specifically, the stop distance calculation unit 14 can calculate the stop distance Sp as $Sp=V^2/2Dp$.

In the distance comparison step of Step S4, the distance comparison unit 15 compares the remaining distance Sr and stop distance Sp. The slave controller 5, in the case of the stop distance Sp exceeding the remaining distance Sr (Sp>Sr), executes the limit deceleration calculation step of Step S5 and the limit stop control step of Step S6, and in the case of the stop distance Sp being no more than the remaining distance Sr (Sp≤Sr), executes the normal stop control step of Step S7.

In the limit deceleration calculation step of Step S5 executed in a case of the stop distance Sp exceeding the remaining distance Sr, the limit deceleration calculation unit 16 acquires the current velocity V of the mobile body 3, and calculates the limit deceleration (deceleration at which the movement amount until the movement when the velocity of the mobile body 3 becomes zero equals the remaining distance Sr) Dr in which the mobile body 3 can stop in the remaining distance Sr calculated by the remaining distance calculation unit 13. More specifically, the limit deceleration calculation unit 16 can calculate the limit deceleration Dr as $Dr=V^2/2Sr$.

In the limit stop control step of Step S6 executed in case of the stop distance Sp exceeding the remaining distance Sr, the limit stop control unit 17 controls the drive mechanism 4 so as to stop the mobile body at a deceleration of at least the limit deceleration Dr. It is thereby possible to prevent the mobile body 3 from colliding with the support bodies 10, 11, without stopping.

It should be noted that, since an upper limit exists according to the specifications of the servo amplifier 6 or servomotor 7 in the deceleration of the mobile body 3, in the case of the velocity V of the mobile body 3 being large, and the remaining distance Sr being short, there is a possibility of not being able to stop the mobile body 3 at the movement limit positions P1, P2. However, while the master controller 2 is properly functioning, since control such that ceases the mobile body 3 between the movement limit positions P1, P2 is performed, in the case of control no longer being possible by the master controller 2, it is possible to stop the mobile body 3 between the movement limit positions P1, P2 so long as executing the control method of the present embodiment without delay.

According to the characteristics of the servomotor 7, etc., when detection of an abnormal state by the abnormality detection unit 12 is delayed and the value of deceleration set by the slave controller 5 exceeds the limit of the servo amplifier 6 or servomotor 7, there is a possibility of the deceleration torque greatly declining. In the case of the servomotor 7 having such a characteristic, the upper limit may be set as the value of deceleration set by the slave controller 5. In other words, when the detection of an abnormal state by the abnormality detection unit 12 is delayed and the limit deceleration Dr exceeds the maximum acceleration which can be realized by the drive mechanism 4, the value of deceleration set by the slave controller 5 may be set as a value equal to the maximum acceleration of the drive mechanism 4.

In the case of the movement limit positions P1, P2 being positions leaving a certain margin, it is preferable to set the actual deceleration equal to the limit deceleration Dr. In other words, it is preferable to set the movement limit positions P1, P2 by taking account of the control error so that it is possible to make the actual deceleration equal to the limit deceleration Dr. In addition, in the case of the movement limit positions P1, P2 being positions not leaving sufficient margin, it is possible to configure so that the mobile body 3 does not collide with the support bodies 10, 11 even if there is control error, by setting the actual deceleration as a value larger by a fixed amount than the limit deceleration Dr.

In the normal stop control step of Step S7 executed in a case of the stop distance Sp being no more than the remaining distance Sr, the normal stop control unit 18 controls the drive mechanism 4 so as to make the mobile body 3 stop at the setting deceleration Dp. It is thereby possible to prevent the time until the mobile body 3 stops from becoming longer than necessary.

As is evident, from the above explanation, the slave controller according to an embodiment of the present invention is a control device which controls the drive mechanism 4 which causes the mobile body 3 to move according to an instruction from the master controller 2, and includes: the abnormality detection unit 12 which detects an abnormal state in which control by the master controller 2 is not possible; the remaining distance calculation unit 13 which calculates the remaining distance Sr until the movement limit positions P1, P2 in the current movement direction of the mobile body 3, when the abnormality detection unit 12 detected an abnormality state; the limit deceleration calculation unit 16 which calculates the limit deceleration Dr in which the mobile body 3 can stop in the remaining distance Sr calculated by the remaining distance calculation unit 13; and the limit stop control unit 17 which controls the drive mechanism 4 so as to cause the mobile body 3 to stop at a deceleration of at least the limit deceleration Dr. It is thereby possible to prevent the mobile body 3 from not completely stopping and colliding with the support bodies 10, 11, in a case of becoming an abnormal state in which control by the master controller 2 is not possible, as well as possible to keep the deceleration of the mobile body 3 at the minimum required and suppress vibration and the load on the drive mechanism 4.

In addition, the slave controller 5 further includes: the stop distance calculation unit 14 which calculates the stop distance Sp which the mobile body 3 moves until stopping in a case of decelerating at the setting deceleration Dp which is set in advance, when the abnormality detection unit 12 detects an abnormal state; and the normal stop control unit 18 which controls the drive mechanism 4 so as to stop the mobile body 3 at the setting deceleration Dp, in a case of the stop distance Sp being no more than the remaining distance Sr, and controls the drive mechanism 4 to cause the mobile body 3 to stop at a deceleration of at least the limit deceleration Dr by way of the limit stop control unit 17, only in the case of the stop distance Sp exceeding the remaining distance Sr. It is thereby possible to quickly stop the mobile body 3, without reducing deceleration of the mobile body 3 more than necessary.

Although an embodiment of the present invention has been explained above, the present invention is not to be limited to the aforementioned embodiment. In addition, the effects described in the present embodiment are merely listing the most ideal effects produced from the present invention, and the effects according to the present invention are not to be limited to those described in the present embodiment.

The advantageous effects of the above slave controller 5 are also advantageous effects of the control method according to an embodiment of the present invention, and the program according to an embodiment of the present invention.

The control method, control device and program according to the present invention may constantly calculate a limit deceleration, in a case of detecting an abnormal state in which control by the master controller is not possible, and control the drive mechanism so as to stop the mobile body at a deceleration which is at least the limit deceleration. In other words, in the control method according to the present invention, a stop distance calculation step, distance comparison step and normal stop control step are not essential components; in the control device according to the present invention, the stop distance calculation unit, distance comparison unit and normal stop control unit are not essential components; and in the program according to the present invention, the stop distance calculation element, distance comparison element and normal stop control element are not essential components.

The control method, control device and program according to the present invention can also be applied to drive mechanisms other than one which linearly moves a mobile body. More specifically, the control method, control device and program according to the present invention can be applied to the control of any drive mechanism in which the movable range of the mobile body is limited, such as a drive mechanism which causes the mobile body to swing within a fixed range, for example.

EXPLANATION OF REFERENCE NUMERALS 1 drive system.
2 master controller
3 mobile body
4 drive mechanism
5 slave controller (control device)
12 abnormality detection unit
13 remaining distance calculation unit
14 stop distance calculation unit
15 distance comparison unit.
16 limit deceleration calculation unit
17 limit stop control unit
18 normal stop control unit.

What is claimed is:

1. A control method for a drive mechanism in a drive system which causes a mobile body to move by way of the drive mechanism according to an instruction from a master controller, the control method comprising:
    an abnormality detection step of detecting an abnormal state in which control by the master controller is not possible due to a communication abnormality;
    a remaining distance calculation step of calculating a remaining distance until a movement limit position in a current movement direction of the mobile body, when having detected an abnormal state in the abnormality detection step;
    a limit deceleration calculation step of calculating a limit deceleration in which the mobile body can stop in the remaining distance which was calculated in the remaining distance calculation step; and
    a limit stop control step of controlling the drive mechanism so as to cause the mobile body to stop at a deceleration of at least the limit deceleration,
    wherein the control method is to be implemented by a slave controller, the slave controller being different from the master controller.

2. The control method according to claim 1, further comprising:
    a stop distance calculation step of calculating a stop distance by which the mobile body moves until stopping in a case of decelerating at a setting deceleration which is set in advance, when having detected an abnormal state in the abnormality detection step; and
    a normal stop control step of controlling the drive mechanism so as to cause the mobile body to stop at the setting deceleration, in a case of the stop distance being no more than the remaining distance,
    wherein the limit stop control step is performed only in a case of the stop distance exceeding the remaining distance.

3. A control device for controlling a drive mechanism which causes a mobile body to move according to an instruction from a master controller, the control device comprising:

an abnormality detection unit which detects an abnormal state in which control by the master controller is not possible due to a communication abnormality;

a remaining distance calculation unit which calculates a remaining distance until a movement limit position in a current movement direction of the mobile body, when the abnormality detection unit detected an abnormal state;

a limit deceleration calculation unit which calculates a limit deceleration in which the mobile body can stop in the remaining distance calculated by the remaining distance calculation unit; and a limit stop control unit which controls the drive mechanism so as to cause the mobile body to stop at a deceleration of at least the limit deceleration, wherein the control device is a slave controller and is different from the master controller.

4. A non-transitory program recording medium which non-transitorily records a program for a control device controlling a drive mechanism that causes a mobile body to move according to an instruction from a master controller, the program comprising:

an abnormality detection element which detects an abnormal state in which control by the master controller is not possible due to a communication abnormality;

a remaining distance calculation element which calculates a remaining distance until a movement limit position in a current movement direction of the mobile body, when the abnormality detection element detected an abnormal state;

a limit deceleration calculation element which calculates a limit deceleration in which the mobile body can stop in the remaining distance calculated by the remaining distance calculation element; and a limit stop control element which controls the drive mechanism so as to cause the mobile body to stop at a deceleration of at least the limit deceleration, wherein the program is to be implemented by a slave controller, the slave controller being different from the master controller.

\* \* \* \* \*